(12) United States Patent
Sherburne, Jr.

(10) Patent No.: US 7,139,921 B2
(45) Date of Patent: *Nov. 21, 2006

(54) LOW POWER CLOCKING SYSTEMS AND METHODS

(76) Inventor: Robert Warren Sherburne, Jr., 138 Wolfe Grade, Kentfield, CA (US) 94904

( * ) Notice: Subject to any disclaimer, the term of this patent is extended or adjusted under 35 U.S.C. 154(b) by 0 days.

This patent is subject to a terminal disclaimer.

(21) Appl. No.: 10/867,901

(22) Filed: Jun. 14, 2004

(65) Prior Publication Data

US 2004/0243866 A1 Dec. 2, 2004

Related U.S. Application Data

(63) Continuation of application No. 09/837,651, filed on Apr. 18, 2001, now Pat. No. 6,993,669.

(51) Int. Cl.
*G06F 1/32* (2006.01)

(52) U.S. Cl. .................... 713/322; 713/501

(58) Field of Classification Search ............. 713/300, 713/320, 322, 323, 500, 501, 601
See application file for complete search history.

(56) References Cited

U.S. PATENT DOCUMENTS

| | | | | |
|---|---|---|---|---|
| 4,021,784 A | | 5/1977 | Kimlinger .................. 713/401 |
| 5,117,442 A | | 5/1992 | Hall ........................ 375/356 |
| 5,381,157 A | | 1/1995 | Shiga ....................... 343/700 |
| 5,502,819 A | * | 3/1996 | Aldrich et al. ............ 713/375 |
| 5,592,658 A | * | 1/1997 | Noam ....................... 713/503 |
| 5,724,591 A | * | 3/1998 | Hara et al. ................. 713/322 |
| 5,734,878 A | | 3/1998 | Hongo ...................... 713/600 |
| 5,774,703 A | * | 6/1998 | Weiss et al. ............... 713/501 |
| 5,778,218 A | * | 7/1998 | Gulick ...................... 713/503 |
| 5,790,817 A | | 8/1998 | Asghar et al. ............. 710/311 |
| 5,790,877 A | * | 8/1998 | Nishiyama et al. ........ 713/323 |
| 5,799,005 A | | 8/1998 | Soliman .................... 370/335 |
| 5,910,930 A | * | 6/1999 | Dieffenderfer et al. .... 368/156 |
| 5,914,961 A | | 6/1999 | Harris et al. .............. 370/503 |
| 5,925,133 A | * | 7/1999 | Buxton et al. ............. 713/323 |
| 5,960,331 A | | 9/1999 | Weir et al. ................. 455/75 |
| 5,996,083 A | * | 11/1999 | Gupta et al. ............... 713/322 |
| 6,047,214 A | | 4/2000 | Muller et al. .............. 607/61 |
| 6,047,248 A | * | 4/2000 | Georgiou et al. .......... 702/132 |
| 6,052,036 A | | 4/2000 | Enstrom et al. ........... 331/176 |
| 6,088,807 A | * | 7/2000 | Maher et al. .............. 713/324 |
| 6,122,686 A | * | 9/2000 | Barthel et al. ............. 710/100 |
| 6,125,451 A | | 9/2000 | Fukunaga .................. 713/500 |
| 6,141,762 A | | 10/2000 | Nicol et al. ............... 713/300 |
| 6,188,381 B1 | * | 2/2001 | van der Wal et al. ..... 345/581 |
| 6,216,234 B1 | * | 4/2001 | Sager et al. ............... 713/501 |
| 6,236,278 B1 | | 5/2001 | Olgarrd ..................... 331/25 |
| 6,242,953 B1 | | 6/2001 | Thomas ..................... 327/115 |
| 6,300,881 B1 | | 10/2001 | Yee et al. .............. 340/870.02 |

(Continued)

OTHER PUBLICATIONS

Intel, Migrating From Intel SA-100 to Intel 80200 Processor based on XScale™ Microarchitecture. Application Note, Sep. 2000. http://www.intel.com/design/iio/applnots/27340901.pdf.

*Primary Examiner*—Chun Cao

(57) ABSTRACT

A low power reconfigurable processor core includes one or more processing units, each unit having a clock input that controls the performance of the unit; and a controller having a plurality of clock outputs each coupled to a respective clock input of one of the processing units, the controller varying the clock frequency of each processing unit to optimize power consumption and processing power for a task.

18 Claims, 6 Drawing Sheets

U.S. PATENT DOCUMENTS

| | | | |
|---|---|---|---|
| 6,317,840 B1* | 11/2001 | Dean et al. | 713/320 |
| 6,415,152 B1 | 7/2002 | Chung | 455/446 |
| 6,542,754 B1 | 4/2003 | Sayers et al. | 455/502 |
| 6,560,712 B1 | 5/2003 | Arends et al. | 713/320 |
| 6,563,448 B1 | 5/2003 | Fontaine | 341/143 |
| 6,578,155 B1 | 6/2003 | Faucher et al. | 713/501 |
| 6,625,036 B1 | 9/2003 | Horio | 361/760 |
| 6,636,976 B1* | 10/2003 | Grochowski et al. | 713/320 |
| 6,647,502 B1* | 11/2003 | Ohmori | 713/322 |
| 6,711,691 B1* | 3/2004 | Howard et al. | 713/300 |
| 6,807,235 B1* | 10/2004 | Yano et al. | 375/259 |
| 6,829,017 B1 | 12/2004 | Phillips | 348/738 |
| 6,898,721 B1 | 5/2005 | Schmidt | 713/322 |
| 6,993,669 B1 | 1/2006 | Sherburne, Jr. | 713/322 |
| 2001/0014585 A1 | 8/2001 | Nakatsugawa | 455/11.1 |
| 2002/0147932 A1 | 10/2002 | Brock et al. | 713/300 |
| 2002/0169990 A1* | 11/2002 | Sherburne, Jr. | 713/300 |
| 2002/0175839 A1* | 11/2002 | Frey | 341/50 |
| 2002/0184546 A1* | 12/2002 | Sherburne, Jr. | 713/322 |
| 2003/0028844 A1 | 2/2003 | Coombs | 714/796 |
| 2004/0243866 A1 | 12/2004 | Sherburne, Jr. | 713/300 |
| 2005/0117633 A1 | 6/2005 | Schmidt | 375/219 |

* cited by examiner

LOW POWER CLOCKING SYSTEMS AND METHODS

This application is a continuation of U.S. application Ser. No. 09/837,651 filed Apr. 18, 2001 now U.S. Pat. No. 6,993,669 the content of which is incorporated by reference.

BACKGROUND

The present invention relates to a low power electronic device.

Advances in technology have allowed ever increasing functional products that cost less. Due to the increasing functionality, power consumption for each device has also increased. For certain products such as laptop or notebook computers, handheld computers, cellular telephones, and other wireless personal digital assistants that are designed for situations where power outlets are not available, the conservation of power is particularly important.

While portability requires compact, highly integrated devices to decrease size and weight, portable devices are not necessarily simplistic devices. For example, to handle wireless signal processing, cell phones and wireless handheld devices require intensive calculation and processing. One way to achieve high performance is to apply parallelism in the processing of instructions. For example, multiple execution units can be operated in parallel under the control of a dispatcher to permit simultaneous processing of instructions. While the use of multiple parallel-operated execution units increases the performance of the computer, this results in increased power consumption. Even though multiple parallel execution units increase the performance of the processor, power is wasted when some of the execution units are idle or performing no operations during various time intervals.

Designers have used various techniques for reducing power consumption of the processor. For example, as discussed in U.S. Pat. No. 6,088,807 to Maher, et al., the speed of the system clock is reduced to a fraction of the normal operating frequency during periods of inactivity. Since the power consumption of the processor is proportional to the frequency, reducing the frequency of the system clock also reduces the power consumption of the microprocessor. A second technique for reducing power turns off the system clock during periods of inactivity. Turning off the system clock affects all circuitry on the motherboard. Consequently, the circuitry that disables the system clock must also save all pertinent information in the microprocessor and associated board logic and restore the data upon resumption of activity such that the state of the computer after resumption of the system clock will be identical to the state of the computer prior to disabling the system clock. As a result, this technique for consuming power is both costly because of the complicated circuitry and slow because of the need to store and restore the state of the computer.

In clocked synchronous digital systems, a typical design style revolves around a single clock rate that drives all clocked elements of the design. Power is managed by turning on or off the clock to subsets of the system. Alternatively power may also be managed by slowing down the clock to a fraction of its normally active rate. For example, the Oak DSP features a "slow mode" whereby a DSP core may be software configured to divide its input clock by an integer N. The Oak processor is described at www.dspg-.com/prodtech/core/teak.htm.

More recently, designs may rely on dynamic voltage management in order to reduce power consumption as in the Intel Xscale architecture; this however cannot be performed instantly and is targeted at relatively infrequent mode or usage changes. In one implementation of the Intel Xscale for mobile processing applications, the Intel 80200 processor, a single processor core, accepts an input clock frequency of 33 to 66 MHz and uses an internal PLL to lock to the input clock and multiplies the frequency by a variable multiplier to produce a high-speed core clock. This multiplier is initially configured by the PLL configuration pin and can be changed anytime later by software. Software has the ability to change the frequency of the clock without having to reset the core. Changing the clock frequency is similar to entering a low power mode. First, the core is stalled waiting for all processing to complete, second the new configuration is programmed, and then finally the core waits for the PLL to re-lock. This feature allows software to conserve power by matching the core frequency to the current workload.

SUMMARY

A system with multiple processing elements is dynamically managed on a per-task basis so as to clock each element at the lowest rate possible, either to reduce peak power dissipation, reduce average power dissipation, minimize buffer memory size and power, or to achieve a related, intermediate goal.

In one aspect, a low power reconfigurable processor core includes one or more processing units, each unit having a clock input that controls the performance of the unit; and a controller having a plurality of clock outputs each coupled to a respective clock input of one of the processing units, the controller varying the clock frequency of each processing unit to optimize power consumption and processing power for a task.

Implementations of the above aspect may include one or more of the following. The system uses a plurality of clock signals, each independently rate controlled to single destination processing element, in a system on a chip which comprises multiple such processors. In one implementation, these clocks may be all derivatives of a single master clock. In another implementation, the clocks can be gated versions of a master clock, thus retaining a level of synchronous relationship to each other.

The system can change the clock rate of each processor independently of all the other processors, as a result of a decision or algorithm invoked in order to accomplish some goal, such as power reduction, buffer memory management, or emissions control. The clock rate management may be pre-assigned based upon tasks or routines handled by each processor, or it may be invoked as a result of external or internal system stimuli, including but not limited to user input or thermal management.

The system allows these changes to occur on-the-fly, during normal operation as the processors' tasks or needs vary. The control of each processor's clock rate may or may not be performed in a centralized manner on the chip. Clock rate control need not be limited to simple clock division, but rather may be more sophisticated and flexible so as to obtain rates such as three-eighths or two-thirds of the driving clock.

Each processing element may connect to other processing elements through use of buffer memories or FIFOs. A FIFO, for example, may support isosynchronous or even asynchronous read versus write ports, hence supporting mismatched rate processing elements.

Advantages of the system may include one or more of the following. The system reduces power dissipation. This yields the benefit of longer usage time per battery replacement or charging; reduced weight and size by use of fewer and/or smaller batteries; reduced thermal and electromagnetic emissions; and increased reliability. The system is ideal for battery-operated processor-based equipment, where it is desirable to minimize battery size so that the equipment can be made small and lightweight. The reduction is due to the fact that the functional units are not kept on when they are not needed. As will be explained in detail below, since CMOS technology is used, power is only consumed when a functional unit is changing state (i.e., switching). Since a functional unit is "off" when it is prevented from changing state, negligible power is consumed by that functional unit. This means that a functional unit that is off does not consume power, which results in the power consumption reduction. Since power consumption is reduced, the heat dissipation requirements and associated packaging of the system is reduced. In addition, when a battery source is used, it can be made smaller for a given operational period of time. Furthermore, because power consumption is reduced, the line width of power supply buses can also be reduced.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
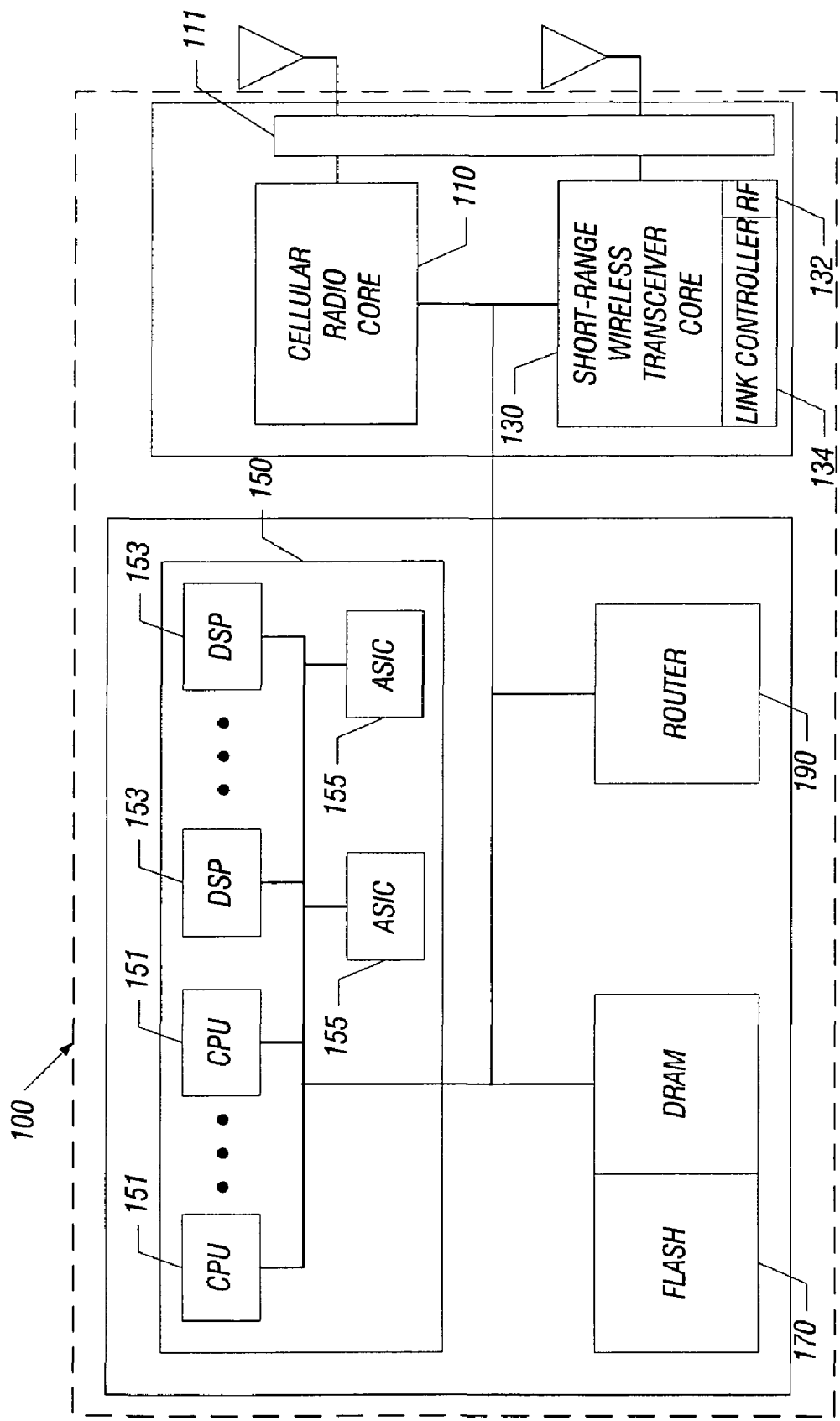
FIG. 1 is a block diagram of a single chip wireless communications integrated circuit.

FIG. 1 shows a block diagram of a multi-mode wireless communicator device 100 fabricated on a single silicon integrated chip. In one implementation, the device 100 is an integrated CMOS device with radio frequency (RF) circuits, including a cellular radio core 110, a short-range wireless transceiver core 130, and a sniffer 111, along side digital circuits, including a reconfigurable processor core 150, a high-density memory array core 170, and a router 190. The high-density memory array core 170 can include various memory technologies such as flash memory and dynamic random access memory (DRAM), among others, on different portions of the memory array core.

The reconfigurable processor core 150 can include one or more processors 151 such as MIPS processors and/or one or more digital signal processors (DSPs) 153, among others. The reconfigurable processor core 150 has a bank of efficient processors 151 and a bank of DSPs 153 with embedded functions. These processors 151 and 153 can be configured to operate optimally on specific problems. For example, the bank of DSPs 153 can be optimized to handle discrete cosine transforms (DCTs) or Viterbi encodings, among others. Additionally, dedicated hardware 155 can be provided to handle specific algorithms in silicon more efficiently than the programmable processors 151 and 153. The number of active processors is controlled depending on the application, so that power is not used when it is not needed. This embodiment does not rely on complex clock control methods to conserve power, since the individual clocks are not run at high speed, but rather the unused processor is simply turned off when not needed.

One exemplary processor embedded in the multi-processor core 150 includes a register bank, a multiplier, a barrel shifter, an arithmetic logic unit (ALU) and a write data register. The exemplary processor can handle DSP functions by having a multiply-accumulate (MAC) unit in parallel with the ALU. Embodiments of the processor can rapidly execute multiply-accumulate (MAC) and add-compare-subtract (ACS) instructions in either scalar or vector mode. Other parts of the exemplary processor include an instruction pipeline, a multiplexer, one or more instruction decoders, and a read data register. A program counter (PC) register addresses the memory system 170. A program counter controller serves to increment the program counter value within the program counter register as each instruction is executed and a new instruction must be fetched for the instruction pipeline. Also, when a branch instruction is executed, the target address of the branch instruction is loaded into the program counter by the program counter controller. The processor core 150 incorporates data pathways between the various functional units. The lines of the data pathways may be synchronously used for writing information into the core 150, or for reading information from the core 150. Strobe lines can be used for this purpose.

In operation, instructions within the instruction pipeline are decoded by one or more of the instruction decoders to produce various core control signals that are passed to the different functional elements of the processor core 150. In response to these core control signals, the different portions of the processor core conduct processing operations, such as multiplication, addition, subtraction and logical operations. The register bank includes a current programming status register (CPSR) and a saved programming status register (SPSR). The current programming status register holds various condition and status flags for the processor core 150. These flags may include processing mode flags (e.g. system mode, user mode, memory abort mode, etc.) as well as flags indicating the occurrence of zero results in arithmetic operations, carries and the like.

Through the router 190, the multi-mode wireless communicator device 100 can detect and communicate with any wireless system it encounters at a given frequency. The router 190 performs the switch in real time through an engine that keeps track of the addresses of where the packets are going. The router 190 can send packets in parallel through two or more separate pathways. For example, if a Bluetooth™ connection is established, the router 190 knows which address it is looking at and will be able to immediately route packets using another connection standard. In doing this operation, the router 190 working with the RF sniffer 111 periodically scans its radio environment ('ping') to decide on optimal transmission medium. The router 190 can send some packets in parallel through both the primary and secondary communication channel to make sure some of the packets arrive at their destinations.

The reconfigurable processor core 150 controls the cellular radio core 110 and the short-range wireless transceiver core 130 to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™. The cell phone core 110 provides wide area network (WAN) access, while the short-range wireless transceiver core 130 supports local area network (LAN) access. The reconfigurable processor core 150 has embedded read-only-memory (ROM) containing software such as IEEE802.11, GSM, GPRS, Edge, and/or Bluetooth™ protocol software, among others.

In one embodiment, the cellular radio core 110 includes a transmitter/receiver section that is connected to an off-chip antenna (not shown). The transmitter/receiver section is a direct conversion radio that includes an I/Q demodulator, transmit/receive oscillator/clock generator, multi-band power amplifier (PA) and PA control circuit, and voltage-controlled oscillators and synthesizers. In another embodiment of a transmitter/receiver section, intermediate frequency (IF) stages are used. In this embodiment, during cellular reception, the transmitter/receiver section converts received signals into a first intermediate frequency (IF) by mixing the received signals with a synthesized local oscillator frequency and then translates the first IF signal to a second IF signal. The second IF signal is hard-limited and processed to extract an RSSI signal proportional to the logarithm of the amplitude of the second IF signal. The hard-limited IF signal is processed to extract numerical values related to the instantaneous signal phase, which are then combined with the RSSI signal.

For voice reception, the combined signals are processed by the processor core 150 to form PCM voice samples that are subsequently converted into an analog signal and provided to an external speaker or earphone. For data reception, the processor simply transfers the data over an input/output (I/O) port. During voice transmission, an off-chip microphone captures analog voice signals, digitizes the signal, and provides the digitized signal to the processor core 150. The processor core 150 codes the signal and reduces the bit-rate for transmission. The processor core 150 converts the reduced bit-rate signals to modulated signals such as I,I,Q,Q modulating signals, for example. During data transmission, the data is modulated and the modulated signals are then fed to the cellular telephone transmitter of the transmitter/receiver section.

Turning now to the short-range wireless transceiver core 130, the short-range wireless transceiver core 130 contains a radio frequency (RF) modem core 132 that communicates with a link controller core 134. The processor core 150 controls the link controller core 134. In one embodiment, the RF modem core 132 has a direct-conversion radio architecture with integrated VCO and frequency synthesizer. The RF-unit 132 includes an RF receiver connected to an analog-digital converter (ADC), which in turn is connected to a modem performing digital modulation, channel filtering, AFC, symbol timing recovery, and bit slicing operations. For transmission, the modem is connected to a digital to analog converter (DAC) that in turn drives an RF transmitter.

The link controller core 134 provides link control function and can be implemented in hardware or in firmware. One embodiment of the core 134 is compliant with the Bluetooth™ specification and processes Bluetooth™ packet types. For header creation, the link controller core 134 performs a header error check, scrambles the header to randomize the data and to minimize DC bias, and performs forward error correction (FEC) encoding to reduce the chances of getting corrupted information. The payload is passed through a cyclic redundancy check (CRC), encrypted/scrambled and FEC-encoded. The FEC encoded data is then inserted into the header.

In one exemplary operating sequence, a user is in his or her office and browses a web site on a portable computer through a wired local area network cable such as an Ethernet cable. Then the user walks to a nearby cubicle. As the user disconnects, the device 100 initiates a short-range connection using a Bluetooth™ connection. When the user drives from his or her office to an off-site meeting, the Bluetooth™ connection is replaced with cellular telephone connection. Thus, the device 100 enables easy synchronization and mobility during a cordless connection, and open up possibilities for establishing quick, temporary (ad-hoc) connections with colleagues, friends, or office networks. Appliances using the device 100 are easy to use since they can be set to automatically find and contact each other when within range.

When the multi-mode wireless communicator device 100 is in the cellular telephone connection mode, the short-range wireless transceiver core 130 is powered down to save power. Unused sections of the chip are also powered down to save power. Many other battery-power saving features are incorporated, and in particular, the cellular radio core 110 when in the standby mode can be powered down for most of the time and only wake up at predetermined instances to read messages transmitted by cellular telephone base stations in the radio's allocated paging time slot.

When the user arrives at the destination, according to one implementation, the cellular radio core 110 uses idle time between its waking periods to activate the short-range wireless transceiver core 130 to search for a Bluetooth™ channel signal. If Bluetooth™ signals are detected, the phone sends a deregistration message to the cellular system and/or a registration message to the Bluetooth™ system. Upon deregistration from the cellular system, the cellular radio core 110 is turned off or put into a deep sleep mode with periodic pinging and the short-range wireless transceiver core 130 and relevant parts of the synthesizer are powered up to listen to the Bluetooth™ channel.

According to one implementation, when the short-range wireless core 130 in the idle mode detects that Bluetooth™ signals have dropped in strength, the device 100 activates the cellular radio core 110 to establish a cellular link, using information from the latest periodic ping. If a cellular connection is established and Bluetooth™ signals are weak, the device 100 sends a deregistration message to the Bluetooth™ system and/or a registration message to the cellular system. Upon registration from the cellular system, the short-range transceiver core 130 is turned off or put into a deep sleep mode and the cellular radio core 110 and relevant parts of the synthesizer are powered up to listen to the cellular channel.

The router 190 can send packets in parallel through the separate pathways of cellular or Bluetooth™. For example, if a Bluetooth™ connection is established, the router 190 knows which address it is looking at and will be able to immediately route packets using another connection standard. In doing this operation, the router 190 pings its environment to decide on optimal transmission medium. If the signal reception is poor for both pathways, the router 190 can send some packets in parallel through both the primary and secondary communication channel (cellular and/or Bluetooth™) to make sure some of the packets arrive at their destinations. However, if the signal strength is adequate, the router 190 prefers the Bluetooth™ mode to minimize the number of subscribers using the capacity-limited and more expensive cellular system at any give time. Only a small percentage of the device 100, those that are temporarily outside the Bluetooth™ coverage, represents a potential load on the capacity of the cellular system, so that the number of mobile users can be many times greater than the capacity of the cellular system alone could support.

FIGS. 2–5 show exemplary embodiments to conserve power in a system with a plurality of processing elements or units 310, 312, 314, 316 and 318. In these embodiments, processing units 310–312 operate in parallel, while processing units 314, 316, and 318 operate in seriatim based on the previous processing unit's outputs. Multiple instructions are executed at the same time in the different execution units 310, 312, 314, 316 and 318, as long as these instructions do not contend for the same resources (namely, shared memory). As discussed below, power can be saved by varying the clock frequency, the core voltage or a combination thereof, if necessary, to reduce heat or to reduce battery power consumption.

Figure 2:
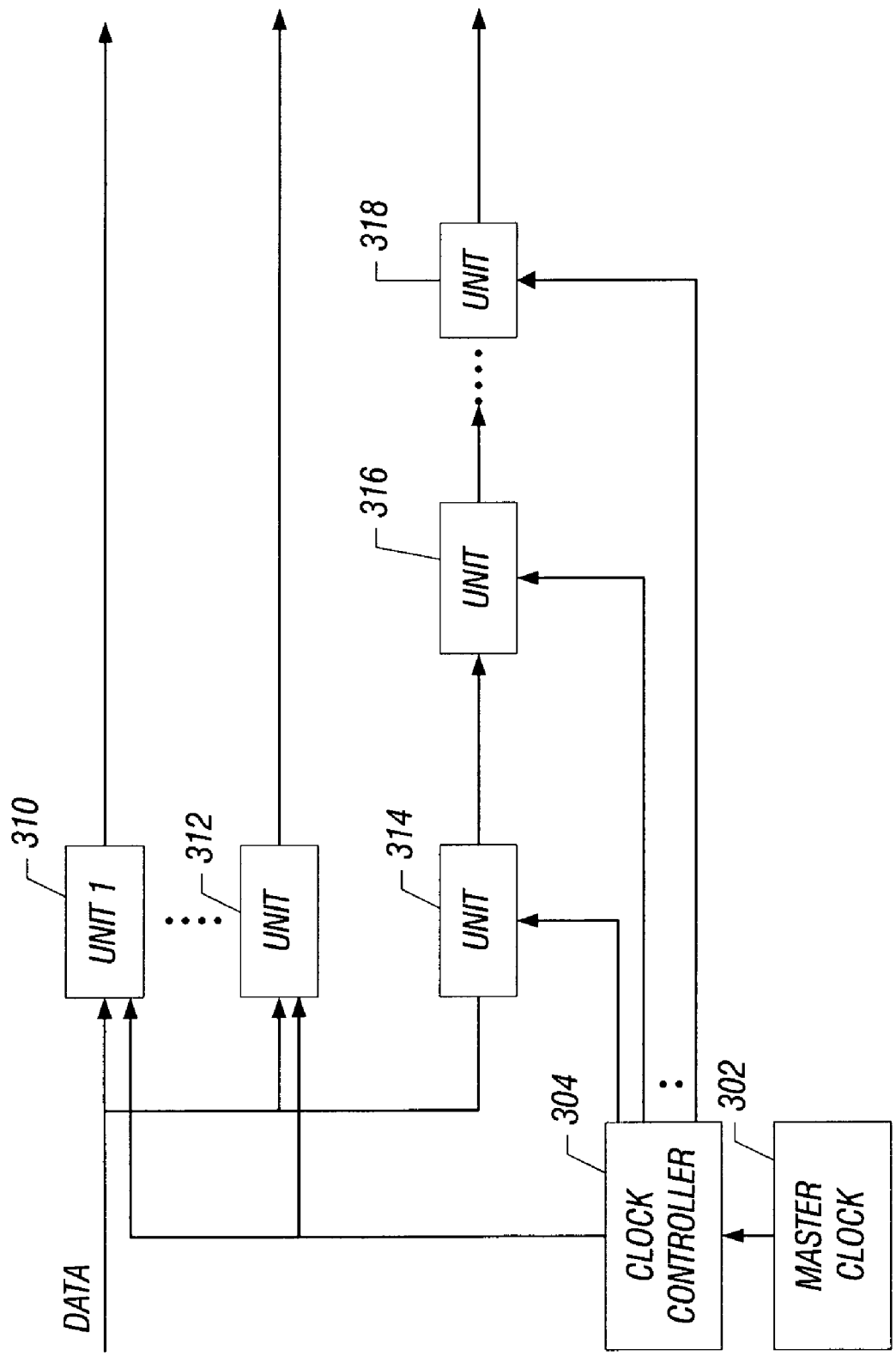
FIG. 2 is a block diagram of a first embodiment to conserve power consumption for a plurality of processing units operating in parallel.

FIG. 2 is a block diagram of a first embodiment to conserve power consumption for a plurality of processing units operating in parallel. This embodiment relies on varying the clock signals to control power consumption. Each of the processing units 310, 312, 314, 316 and 318 is powered by the same voltage rail. A master clock 302 supplies a master clock signal to a clock controller 304. The clock controller 304 determines for each application the appropriate clock signal that is applied to each of processing units 310, 312, 314, 316 and 318. The controller 304 drives the clock input of each of processing units 310, 312, 314, 316 and 318. The clock can be driven independently and can be based on the tasks to be performed. For example, a task-based clock scheme for an exemplary three-processor system at a particular time point is as follows:

simple extension of the invention. Additionally subsets of processing elements may be grouped and managed together as ensembles.

The controller 304 can be implemented in hardware; or the power control may be implemented by means of software. If a high performance operating level of the core is not required for a particular application, software instructions may be utilized to operate the power control circuit. In one implementation, switching ability is no longer provided to the processing unit after a preselected clock cycle period after the processing unit has completed the required task of executing the machine code instruction of the computer program to turned off (de-activated) the unit after it has executed the required task.

Figure 3:
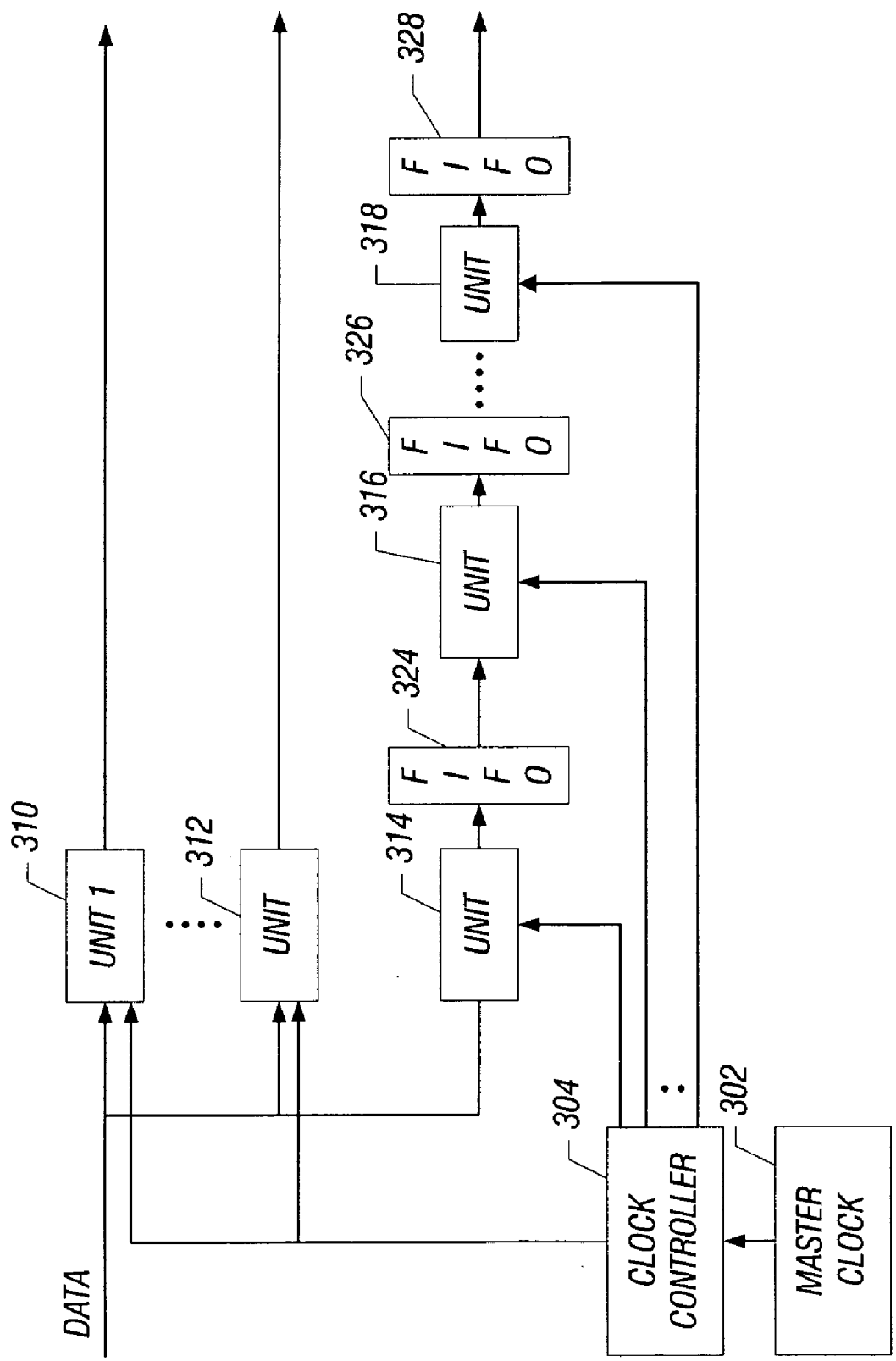
FIG. 3 is a block diagram of a second embodiment to conserve power consumption for a plurality of processing units operating in parallel.

FIG. 3 is a block diagram of a second embodiment to conserve power consumption for a plurality of processing units operating in parallel. This embodiment is similar to the embodiment of FIG. 2, except that the output of each of the sequential processing units 314, 316 and 318 is buffered by buffers 324, 326 and 328, respectively. In one embodiment, the buffers 324, 326 and 328 are first-in-first-out (FIFO) buffers.

Figure 4:
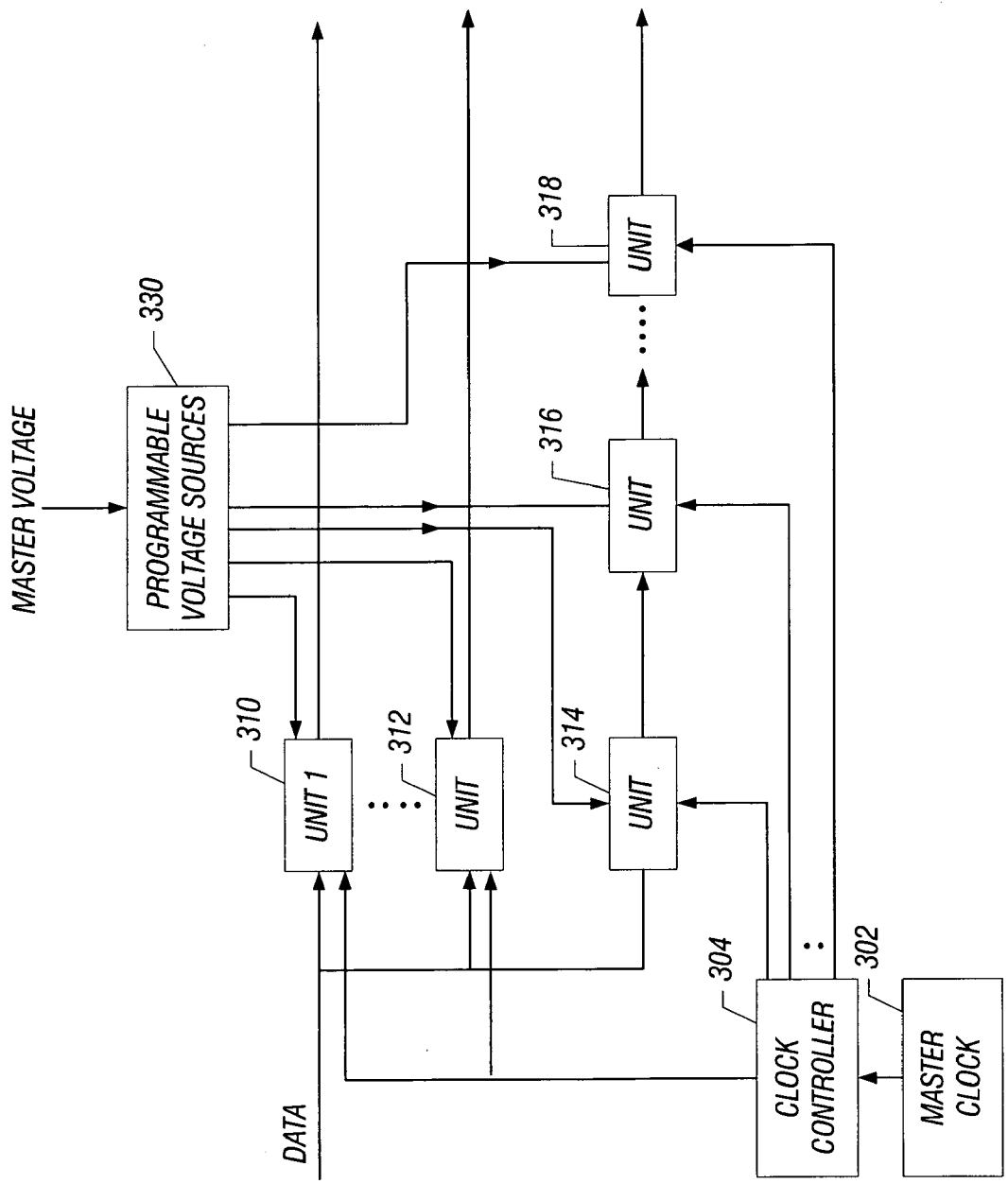
FIG. 4 is a block diagram of a third embodiment to conserve power consumption for a plurality of processing units operating in parallel.
Figure 5:
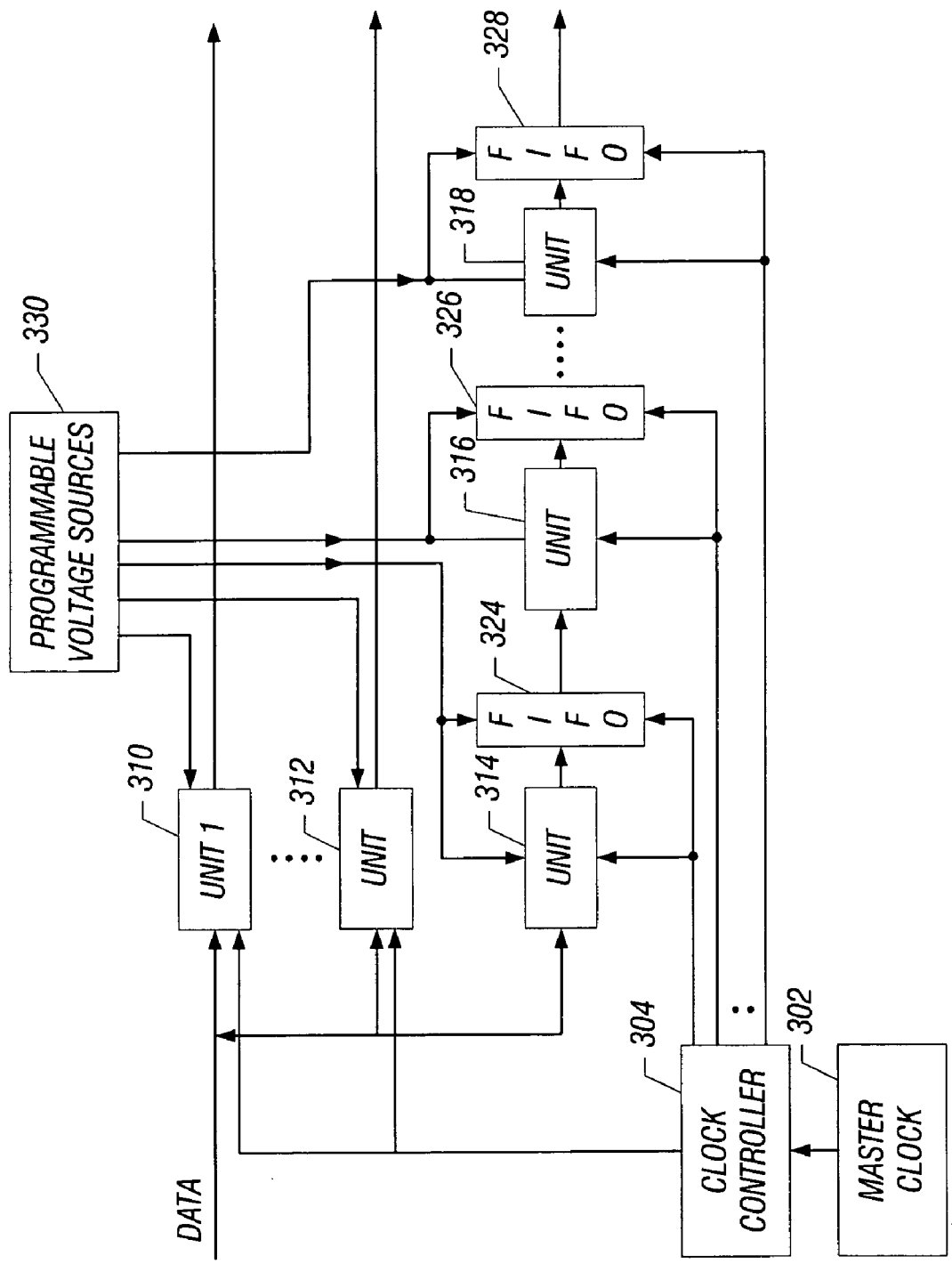
FIG. 5 is a block diagram of a fourth embodiment to conserve power consumption for a plurality of processing units operating in parallel.

FIG. 4 is a block diagram of a third embodiment to conserve power consumption for a plurality of processing units operating in parallel. This embodiment is also similar to the embodiment of FIG. 2, with the addition of a programmable voltage source 330. FIG. 5 is a block diagram of a fourth embodiment similar to the embodiment of FIG. 3, except that the buffered processing units operating in parallel at individually controlled supply voltages. In the embodiments of FIGS. 4–5, each of the processing units 310, 312, 314, 316, and 318 is powered by independent voltage rails whose voltage can be varied within a predetermined range.

Figure 6:
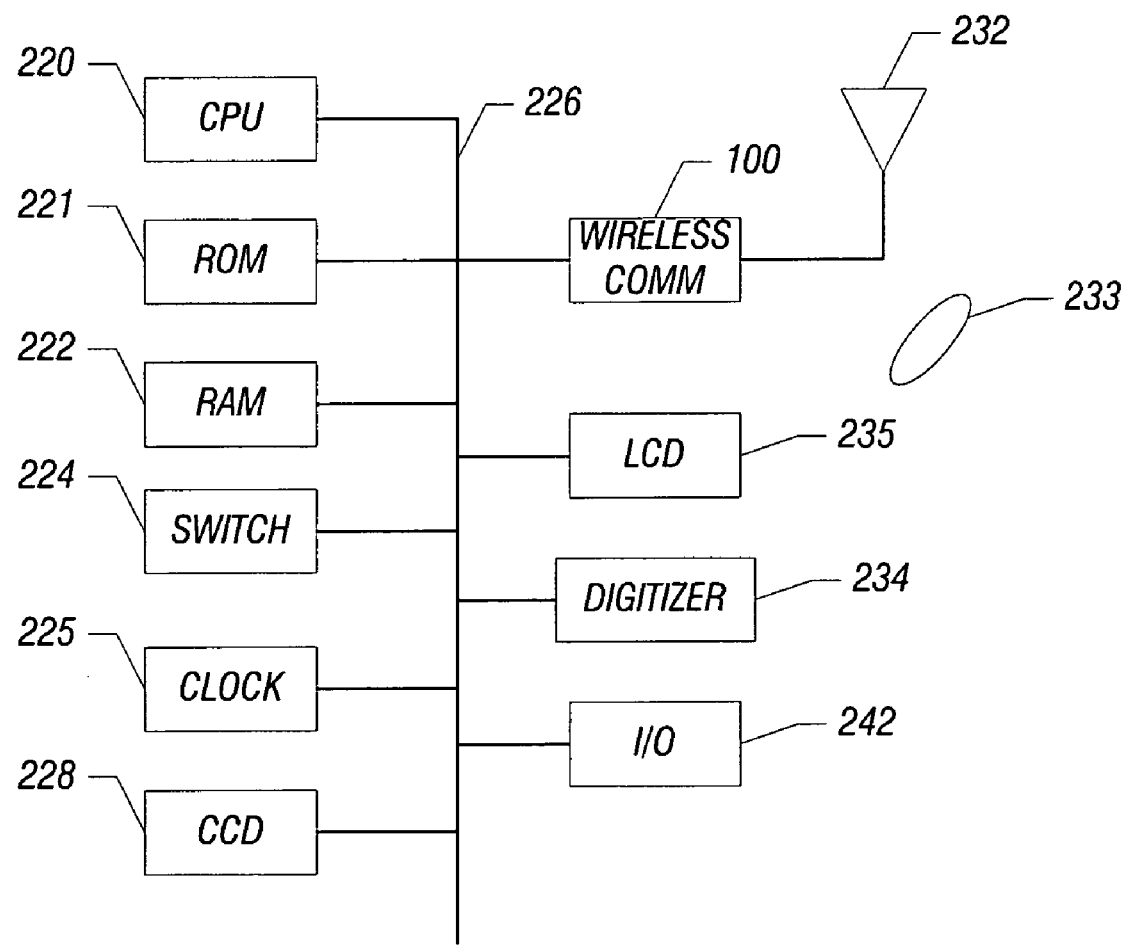
FIG. 6 is a block diagram of a portable computer system in accordance with the present invention.

FIG. 6 illustrates an exemplary computer system 200 with the wireless communication device 100. The computer system 200 is preferably housed in a small, rectangular portable enclosure. Referring now to FIG. 6, a general purpose architecture for entering information into the data management by writing or speaking to the computer system is illustrated. A processor 220 or central processing unit (CPU) provides the processing capability. The processor 220 can be a reduced instruction set computer (RISC) processor or a complex instruction set computer (CISC) processor. In one embodiment, the processor 220 is a low power CPU such as the MC68328V DragonBall device available from Motorola Inc.

The processor 220 is connected to a read-only-memory (ROM) 221 for receiving executable instructions as well as certain predefined data and variables. The processor 220 is also connected to a random access memory (RAM) 222 for storing various run-time variables and data arrays, among

| Processor | Task 1 | Task 2 | Task 3 | Task 4 | Task 5 |
|---|---|---|---|---|---|
| P0 | Clock | Clock | Clock*1/32 | Clock*1/32 | Clock*1/32 |
| P1 | Clock*1/16 | Clock*2/3 | Clock*1/4 | Clock*1/16 | Clock*1/32 |
| P2 | Clock*1/32 | Clock*5/32 | Clock*1/2 | Clock*1/2 | Clock*1/32 |

The table illustrates a sequence of clock management events in a multiple processing element system. Although the figure indicates all processor clocking management to occur coincidentally, generalization of the invention to include unsynchronized and/or gradual rate changes is a others. The RAM 222 is sufficient to store user application programs and data. In this instance, the RAM 222 can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM 221 for data back-up purposes.

The computer system 200 has built-in applications stored in the ROM 221 or downloadable to the RAM 222 which include, among others, an appointment book to keep track of meetings and to-do lists, a phone book to store phone numbers and other contact information, a notepad for simple word processing applications, a world time clock which shows time around the world and city locations on a map, a database for storing user specific data, a stopwatch with an alarm clock and a countdown timer, a calculator for basic computations and financial computations, and a spreadsheet for more complex data modeling and analysis. Additionally, project planning tools, and CAD/CAM systems, Internet browsers, among others, may be added to increase the functionality of portable computing appliances. Users benefit from this software, as the software allows users to be more productive when they travel as well as when they are in their offices.

The computer system 200 receives instructions from the user via one or more switches such as push-button switches in a keypad 224. The processor 220 is also connected to a real-time clock/timer 225 that tracks time. The clock/timer 225 can be a dedicated integrated circuit for tracking the real-time clock data, or alternatively, the clock/timer 225 can be a software clock where time is tracked based on the clock signal clocking the processor 220. In the event that the clock/timer 225 is software-based, it is preferred that the software clock/timer be interrupt driven to minimize the CPU loading. However, even an interrupt-driven software clock/timer 225 requires certain CPU overhead in tracking time. Thus, the real-time clock/timer integrated circuit 225 is preferable where high processing performance is needed.

The processor 220 drives an internal bus 226. Through the bus 226, the computer system can access data from the ROM 221 or RAM 222, or can acquire I/O information such as visual information via a charged coupled device (CCD) 228. The CCD unit 228 is further connected to a lens assembly (not shown) for receiving and focusing light beams to the CCD for digitization. Images scanned via the CCD unit 228 can be compressed and transmitted via a suitable network such as the Internet, through Bluetooth™ channel, cellular telephone channels or via facsimile to a remote site.

Additionally, the processor 220 is connected to the multi-mode wireless communicator device 100, which is connected to an antenna 232. The device 100 satisfies the need to access electronic mail, paging, mode/facsimile, remote access to home computers and the Internet. The antenna 232 can be a loop antenna using flat-strip conductors such as printed circuit board wiring traces as flat strip conductors have lower skin effect loss in the rectangular conductor than that of antennas with round-wire conductors. One simple form of wireless communication device 100 is a wireless link to a cellular telephone where the user simply accesses a cellular channel similar to the making of a regular voice call. Also mention that one channel is reserved for making voice calls. Typically, data channels are not usable for voice communications because of the latency and low packet reliability, so a dedicated voice channel is necessary. In one implementation, GPRS, there are a total of 8 channels per user, one of which is dedicated to voice when the user decides to make a voice call. This voice connection is independent of the data connection.

The processor 220 of the preferred embodiment accepts handwritings as an input medium from the user. A digitizer 234, a pen 233, and a display LCD panel 235 are provided to capture the handwriting. Preferably, the digitizer 234 has a character input region and a numeral input region that are adapted to capture the user's handwritings on words and numbers, respectively. The LCD panel 235 has a viewing screen exposed along one of the planar sides of the enclosure are provided. The assembly combination of the digitizer 234, the pen 233 and the LCD panel 235 serves as an input/output device. When operating as an output device, the screen 235 displays computer-generated images developed by the CPU 220. The LCD panel 235 also provides visual feedback to the user when one or more application software execute. When operating as an input device, the digitizer 234 senses the position of the tip of the stylus or pen 233 on the viewing screen 235 and provides this information to the computer's processor 220. In addition to the vector information, the present invention contemplates that display assemblies capable of sensing the pressure of the stylus on the screen can be used to provide further information to the CPU 220.

The CPU 220 accepts pen strokes from the user using the stylus or pen 233 that is positioned over the digitizer 234. As the user "writes," the position of the pen 233 is sensed by the digitizer 234 via an electromagnetic field as the user writes information to the computer system. The digitizer 234 converts the position information to graphic data. For example, graphical images can be input into the pen-based computer by merely moving the stylus over the surface of the screen. As the CPU 220 senses the position and movement of the stylus, it generates a corresponding image on the screen to create the illusion that the pen or stylus is drawing the image directly upon the screen. The data on the position and movement of the stylus is also provided to handwriting recognition software, which is stored in the ROM 221 and/or the RAM 222. The handwriting recognizer suitably converts the written instructions from the user into text data suitable for saving time and expense information. The process of converting the pen strokes into equivalent characters and/or drawing vectors using the handwriting recognizer is described below.

The computer system is also connected to one or more input/output (I/O) ports 242 which allow the CPU 220 to communicate with other computers. Each of the I/O ports 242 may be a parallel port, a serial port, a universal serial bus (USB) port, a Firewire port, or alternatively a proprietary port to enable the computer system to dock with the host computer. In the event that the I/O port 242 is housed in a docking port, after docking, the I/O ports 242 and software located on a host computer (not shown) support an automatic synchronization of data between the computer system and the host computer. During operation, the synchronization software runs in the background mode on the host computer and listens for a synchronization request or command from the computer system 200 of the present invention. Changes made on the computer system and the host computer will be reflected on both systems after synchronization. Preferably, the synchronization software only synchronizes the portions of the files that have been modified to reduce the updating times. The I/O port 242 is preferably a high speed serial port such as an RS-232 port, a Universal Serial Bus, or a Fibre Channel for cost reasons, but can also be a parallel port for higher data transfer rate.

One or more portable computers 200 can be dispersed in nearby cell regions and communicate with a cellular mobile support station (MSS) as well as a Bluetooth™ station. The cellular and Bluetooth™ stations relay the messages via stations positioned on a global basis to ensure that the user is connected to the network, regardless of his or her reference to home. The stations are eventually connected to the Internet, which is a super-network, or a network of networks, interconnecting a number of computers together using predefined protocols to tell the computers how to locate and exchange data with one another. The primary elements of the Internet are host computers that are linked by a backbone telecommunications network and communicate using one or more protocols. The most fundamental of Internet protocols is called Transmission Control Protocol/ Internet Protocol (TCP/IP), which is essentially an envelope where data resides. The TCP protocol tells computers what is in the packet, and the IP protocol tells computers where to send the packet. The IP transmits blocks of data called datagrams from sources to destinations throughout the Internet. As packets of information travel across the Internet, routers throughout the network check the addresses of data packages and determine the best route to send them to their destinations. Furthermore, packets of information are detoured around non-operative computers if necessary until the information finds its way to the proper destination.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. An integrated circuit comprising:
   a digital portion including:
   a plurality of processors configured to execute one or more algorithms, each of the plurality of processors having a respective clock input to control a rate of processor performance; and
   a controller having a plurality of clock outputs coupled to the respective clock input of the plurality of processors, wherein the controller is configured to vary a clock frequency of at least one of the plurality of processors to control the rate of processor performance; and
   an analog portion coupled to the digital portion, the analog portion including at least one radio frequency (RF) transceiver.

2. The integrated circuit of claim 1, wherein the controller is configured to change one or more of the respective clock inputs on-the-fly.

3. The integrated circuit of claim 1, further comprising a buffer coupled between an output of a first one of the plurality of processors and an input of a second one of the plurality of processors, wherein the buffer is to be controlled by the same clock frequency as the first processor and at a different frequency than the second processor.

4. The integrated circuit of claim 1, wherein the controller is to vary the clock frequency of a subset of the plurality of processors as an ensemble.

5. The integrated circuit of claim 1, wherein the controller is to apply a different frequency clock to the respective clock input of at least some of the plurality of processors.

6. The integrated circuit of claim 1, wherein the controller is to provide the respective clock input of a first one of the plurality of processors with a first clock frequency for a first task and a second frequency for a second task.

7. The integrated circuit of claim 1, wherein the controller is to receive a master clock and to generate the plurality of clock outputs at a frequency of the master clock or a fraction thereof.

8. A method comprising:
   wirelessly communicating via a first wireless protocol using a wireless device having a digital portion including a plurality of processors configured to execute one or more algorithms, each of the plurality of processors having a respective clock input, and a controller having a plurality of clock outputs coupled to the respective clock input of the plurality of processors, wherein the controller is configured to provide different clock frequencies to at least two of the plurality of processors, the wireless device including an analog portion coupled to the digital portion, the analog portion including at least one radio frequency (RF) transceiver; and
   wirelessly communicating via a second wireless protocol using the wireless device.

9. The method of claim 8, wherein the first wireless protocol comprises a short-range wireless protocol and the second wireless protocol comprises a cellular radio protocol.

10. The method of claim 8, further comprising wirelessly communicating via the first wireless protocol and the second wireless protocol simultaneously via the wireless device.

11. The method of claim 8, further comprising wirelessly communicating by switching between the first wireless protocol and the second wireless protocol.

12. The method of claim 8, further comprising powering down a first one of the plurality of processors using the controller when the wireless device is not wirelessly communicating via the first wireless protocol.

13. A system comprising:
   a first processor configured to execute application programs;
   a wireless communicator coupled to the first processor, the wireless communicator including a digital portion having a plurality of processors, wherein at least a first and second of the plurality of processors are coupled in parallel to form a parallel processor path, wherein each of the plurality of processors includes a respective clock input, and a controller having a plurality of clock outputs coupled to the respective clock input of the plurality of processors, wherein the controller is configured to provide a first clock frequency to at least a first one of the plurality of processors and a second clock frequency to at least a second one of the plurality of processors, the wireless communicator further including an analog portion coupled to the digital portion, the analog portion including at least one radio frequency (RF) transceiver; and
   an antenna coupled to the wireless communicator and configured to transmit and receive information via multiple wireless protocols.

14. The system of claim 13, further comprising a digitizer coupled to the first processor and configured to receive input from a user.

15. The system of claim 13, further comprising a capture device coupled to the first processor and configured to capture visual information.

16. The system of claim 13, wherein at least a third and fourth of the plurality of processors are serially coupled to form a serial processor path.

17. The system of claim 16, further comprising a buffer coupled between the third processor and the fourth processor.

18. The system of claim 13, further comprising a programmable voltage source coupled to the plurality of processors and configured to provide an independent voltage source to the plurality of processors.

* * * * *

UNITED STATES PATENT AND TRADEMARK OFFICE
CERTIFICATE OF CORRECTION

| | | |
|---|---|---|
| PATENT NO. | : 7,139,921 B2 | Page 1 of 1 |
| APPLICATION NO. | : 10/867901 | |
| DATED | : November 21, 2006 | |
| INVENTOR(S) | : Robert Warren Sherburne, Jr. | |

It is certified that error appears in the above-identified patent and that said Letters Patent is hereby corrected as shown below:

On the Title Page and Col. 1 lines 1-2:

Title, please delete "Low power clocking systems and methods" and substitute -- Controlling a Clock Frequency of a Plurality of Processors --.

Signed and Sealed this

Twelfth Day of April, 2011

David J. Kappos
*Director of the United States Patent and Trademark Office*